United States Patent
Schafer

(10) Patent No.: US 6,732,425 B2
(45) Date of Patent: May 11, 2004

(54) HEAT EXCHANGER SLEEVE END EXPANDER APPARATUS

(75) Inventor: Bruce W. Schafer, Lynchburg, VA (US)

(73) Assignee: Framatome ANP, Inc., Lynchburg, VA (US)

( * ) Notice: Subject to any disclaimer, the term of this patent is extended or adjusted under 35 U.S.C. 154(b) by 0 days.

(21) Appl. No.: 10/010,152

(22) Filed: Nov. 8, 2001

(65) Prior Publication Data

US 2002/0059725 A1 May 23, 2002

Related U.S. Application Data

(60) Provisional application No. 60/252,314, filed on Nov. 20, 2000.

(51) Int. Cl.[7] ................................................. B23P 15/00
(52) U.S. Cl. ........................ 29/727; 29/726; 29/890.031
(58) Field of Search ........................... 29/727, 890.031, 29/523, 244, 252, 253, 255, 282, 726

(56) References Cited

U.S. PATENT DOCUMENTS

| | | | | |
|---|---|---|---|---|
| 5,606,792 A | * | 3/1997 | Schafer | 29/727 |
| 5,752,311 A | * | 5/1998 | Snyder | 29/723 |
| 5,791,046 A | * | 8/1998 | Schafer | 29/890.031 |
| 5,836,074 A | * | 11/1998 | Hutter et al. | 29/714 |
| 5,909,909 A | * | 6/1999 | Glauber | 29/235 |
| 5,983,487 A | * | 11/1999 | Snow et al. | 29/727 |
| 6,016,678 A | * | 1/2000 | Diller | 72/119 |

* cited by examiner

Primary Examiner—I Cuda Rosenbaum
(74) Attorney, Agent, or Firm—Vytas R. Matas

(57) ABSTRACT

An apparatus is disclosed for expanding the ends of a sleeve that has previously been installed into a defective section of inaccessibly located soft metal heat exchanger tubing. The sleeve ends are expanded using an apparatus of a plastic bladder connected to a series of connectable sections of sufficient length to reach the ends of the installed sleeve. The expansion is performed by locating the plastic bladder inside the sleeve at one end and hydraulically compressing the plastic bladder and forcing it to expand in diameter as a function of Poisson's ratio to thus expand the sleeve end into the tube.

5 Claims, 4 Drawing Sheets

HEAT EXCHANGER SLEEVE END EXPANDER APPARATUS

This application claims the benefit of provisional application Ser. No. 60/252,314 filed Nov. 20, 2000.

BACKGROUND OF THE INVENTION

1. Field of the Invention

The present invention generally relates to heat exchanger tube repair apparatus using a sleeve to repair an inaccessible tube section and more particularly to such tube repairs requiring sleeve end expansion apparatus.

2. Description of the Prior Art

Repair sleeving is known to repair defective portions of heat exchanger tubes. In this defective portion of the tube, both ends of the repair sleeve can be expanded into the parent tube by roll expansion, hydraulic expansion, or other expansion methods. For repair sleeving used to repair heat exchangers that contain soft tubing, such as brass, copper-nickel, copper, carbon steel, etc., there is a need to expand the ends of the sleeve into the tube to minimize the risk of flow erosion/corrosion in the parent tube. This expansion operation minimizes the internal diameter (ID) step between the sleeve and the tube. Another method used to minimize the ID step is to press fit very thin repair sleeves into the defective tube portion. However, if a sleeve is to be installed deep into the tube bundle it is not practical to insert a press fit sleeve due to possible tube ID restrictions. Another option to get the sleeve into close contact with the tube ID is to roll expand the ends. However, it is not always practical to roll expand the sleeve ends due to multiple sleeve locations along the tube length and due to tooling access issues around the heat exchanger. In some instances, the repair sleeve end may be located up to 50 ft. from the tube inlet end but there may be only 5 ft. of clearance between the tube end and an obstruction.

Other than roll expansion of sleeve ends or the use of a special thin sleeve design, no other methods of expanding the very end of the sleeve into contact with the tube are known. Various methods have been tried, including the use of an ID pressurized bladder to expand the sleeve end, but none have met the criteria of producing a reliable sleeve end expansion to a failed tube area located deep within a tube.

The previously explained known sleeve repair techniques used in easily accessible tube areas are discussed in the following U.S. Patents.

U.S. Pat. No. 5,008,996 teaches the use of expansion sleeves in failing areas of heat exchanger tubes. However, it fails to recognize any solution for eliminating the step problem at the end of the sleeve in soft metal heat exchanger tubes and teaches the expansion of sleeves using known rolling and welding techniques.

U.S. Pat. No. 4,876,871 also teaches the use of expansion sleeves in failing areas of heat exchanger tubes. However, it also fails to recognize any solution to the step problem at the end of the sleeve in soft metal heat exchanger tubes and teaches the expansion of sleeves using known rolling devices for sleeve expansion.

U.S. Pat. No. 4,829,648 teaches the use of expansion sleeves in failing areas of heat exchanger tubes. However, it again fails to recognize any solution to the step problem at the end of the sleeve in soft metal heat exchanger tubes and teaches the use of a mandrel to expand the sleeve into the tube.

In view of the foregoing it will be seen that while the use of expansion sleeves in failing areas of heat exchanger tubes are well known, the step problem at the end of the sleeve in soft metal heat exchanger tubes, with the repair sleeves in inaccessible areas, is not specifically addressed in the known prior art and there is no teaching of how to reach such inaccessible areas of the tube let alone how to eliminate the step problem in repair sleeves.

SUMMARY OF THE INVENTION

The present invention solves the mentioned problems associated with known sleeving tube repairs and others by disclosing a method and apparatus for minimizing the step between the inside diameter of a soft metal heat exchanger tube and a sleeve used to repair a failing section of the tube where the known devices used for sleeve end roll expansion cannot reach.

To accomplish this task, a compression bladder tool is used to expand the end of such inaccessible heat exchanger sleeves. The expansion is performed by locating a plastic bladder inside the sleeve at one end and hydraulically compressing the plastic bladder. As the bladder is compressed in length it expands as a function of Poisson's ratio, expanding the sleeve end in the process. The hydraulic expansion force can be varied to produce the appropriate sleeve end expansion to thus minimize the step between the tube section and the repair sleeve. The bladder device is then moved to the other end of the repair sleeve and the process repeated.

In view of the foregoing it will be seen that one aspect of the present invention is to provide a compressible bladder tool for expanding repair sleeve ends in inaccessible failed tube sections.

Another aspect of the present invention is to provide a compressible bladder tool for expanding repair sleeve ends in inaccessible failed tube sections.

Yet another aspect of the present invention is to provide a hydraulically actuated bladder tool for expanding repair sleeve ends into tubes using an easily controlled sleeve end expansion process.

These and other aspects of the present invention will be more fully understood after consideration of the following description of the preferred embodiment taken in conjunction with the accompanying drawings.

DESCRIPTION OF THE PREFERRED EMBODIMENT

Figure 1A:
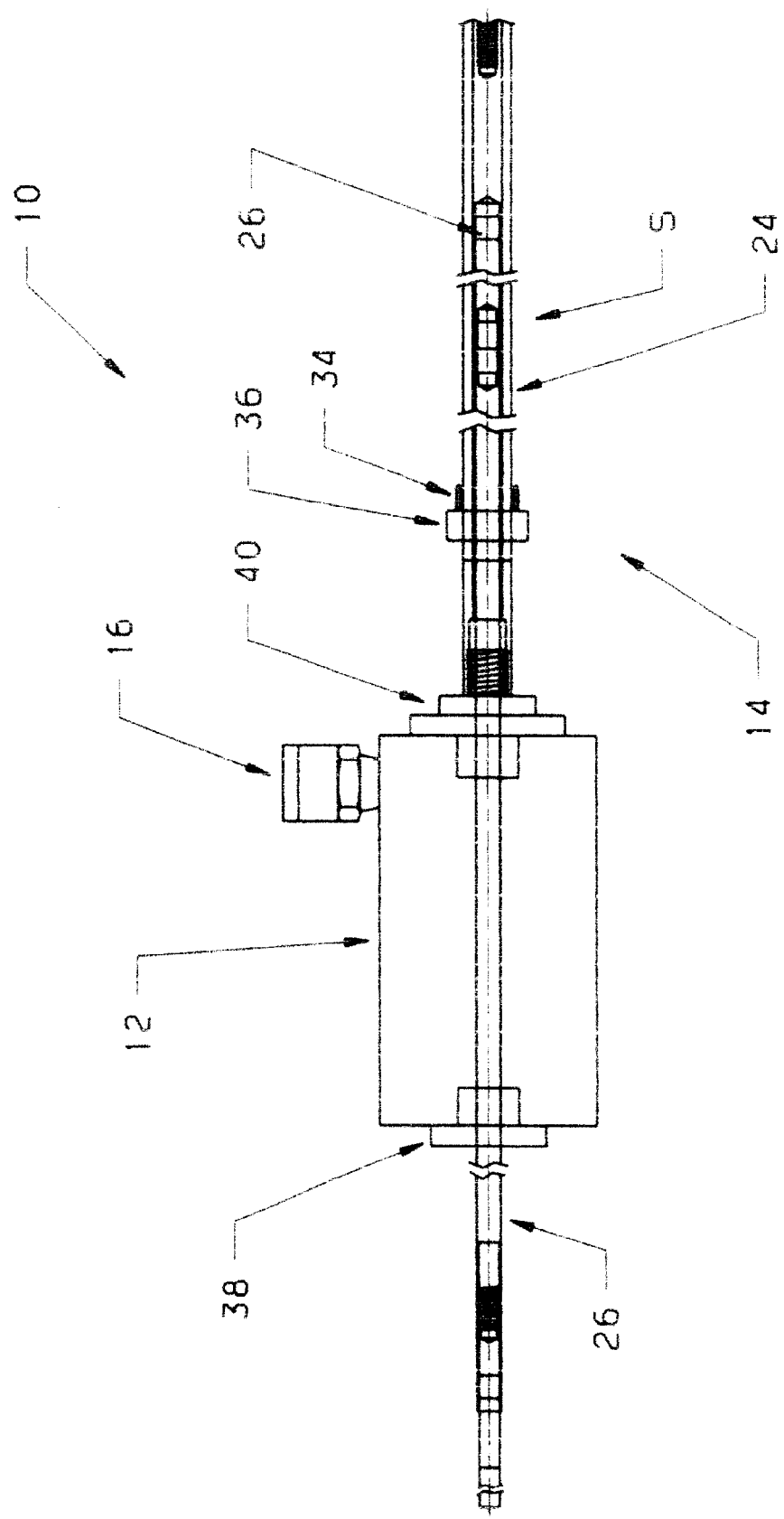
FIG. 1(a) is a side view of one part of the hydraulic expansion bladder tool of the present invention used to expand repair sleeve ends into parent tubing sections.
Figure 1B:
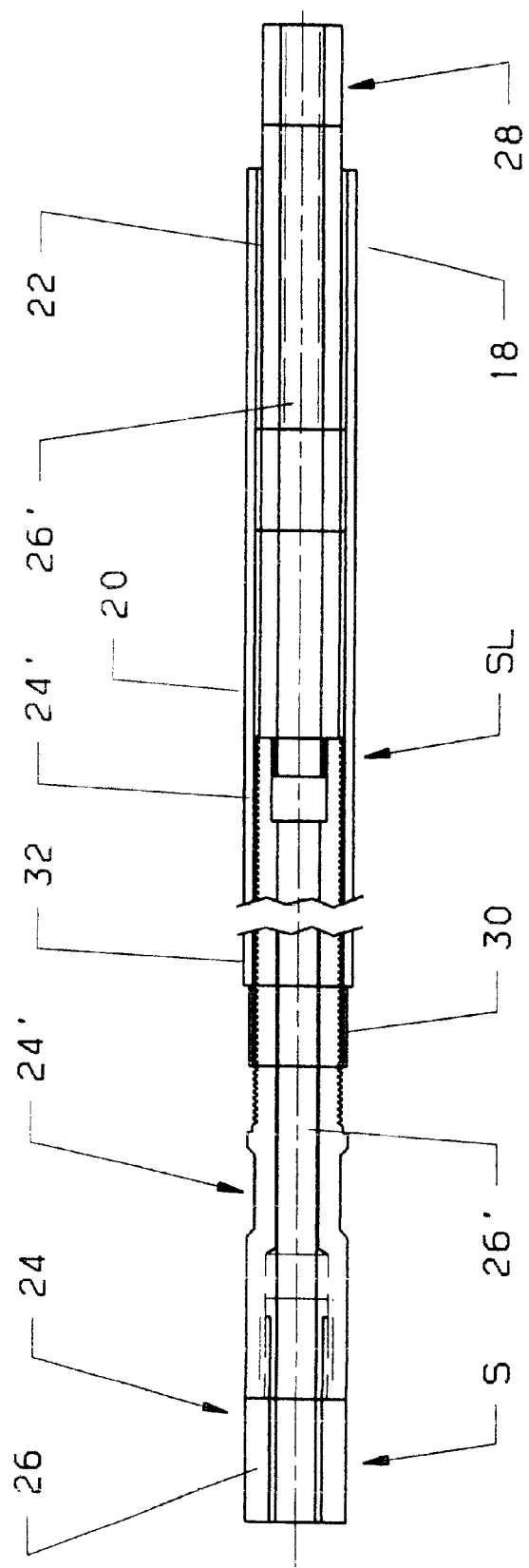
FIG. 1(b) is the end of the expansion bladder tool, as shown in FIG. 1(a) which is in actuality connected to the first part of the tool.

Referring now to the drawings, FIGS. 1(a) and 1(b) shows an expansion tool assembly (10) comprising a known hydraulic cylinder (12) used to pull a rod assembly (14) there through in response to hydraulic pressure applied to the cylinder (12) at inlet (16) from a pump (not shown). The rod assembly (14) is made up of individual segments (S), any number of which are rigidly connected, typically by threading the pieces together, to form an assembly (14) length which will allow it to reach a repair sleeve (18) located in a failed tube section (20) remote from the tube inlet. The assembly (14) has a plastic bladder (22) which is fixed to the last segment (SL). Each segment (S) comprises a tube (24) having a pull rod (26) located inside the tube (24). The tube (24) positions the final segment (SL) and reacts the pull rod load while the pull rod (26) applies the expansion load to the bladder (22). The tubes (24) and rods (26) of each segment are joined, typically by threading the pieces together, to allow them to function as a unit. The pull rod (26') of the last segment (SL) has a threaded stop (28) to allow the pull load to be transmitted to the plastic bladder (22). The other end of the bladder (22) is pushed against the tube (24') of the last segment (SL). After the assembly (14) is in the proper position, hydraulic fluid is pumped to the hydraulic cylinder (12). This actuates the cylinder which applies a load and pulls the rods (26). The bladder (22), which is held between the threaded stop (28) and tube (24'), is compressed in length due to the rods (26, 26') being pulled inside the tubes (24, 24'). Through Poisson's ratio, the bladder (22) expands in diameter in response to this length compression.

Figure 2:
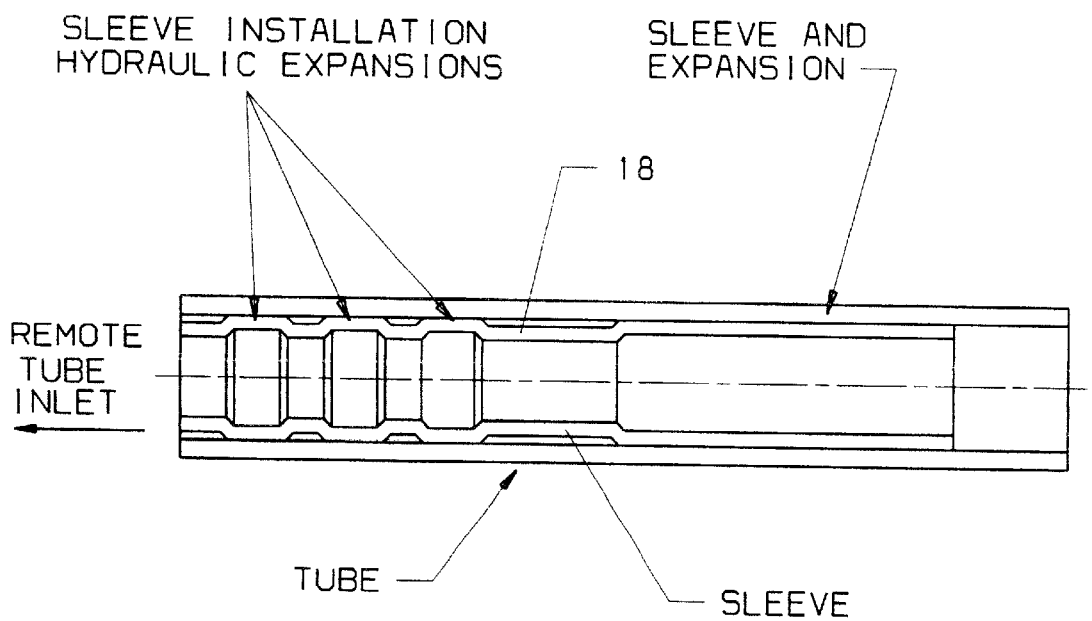
FIG. 2 is a cut away side view of a section of tubing having a repair sleeve therein having its end expanded by the bladder tool of the present invention.
Figure 3:
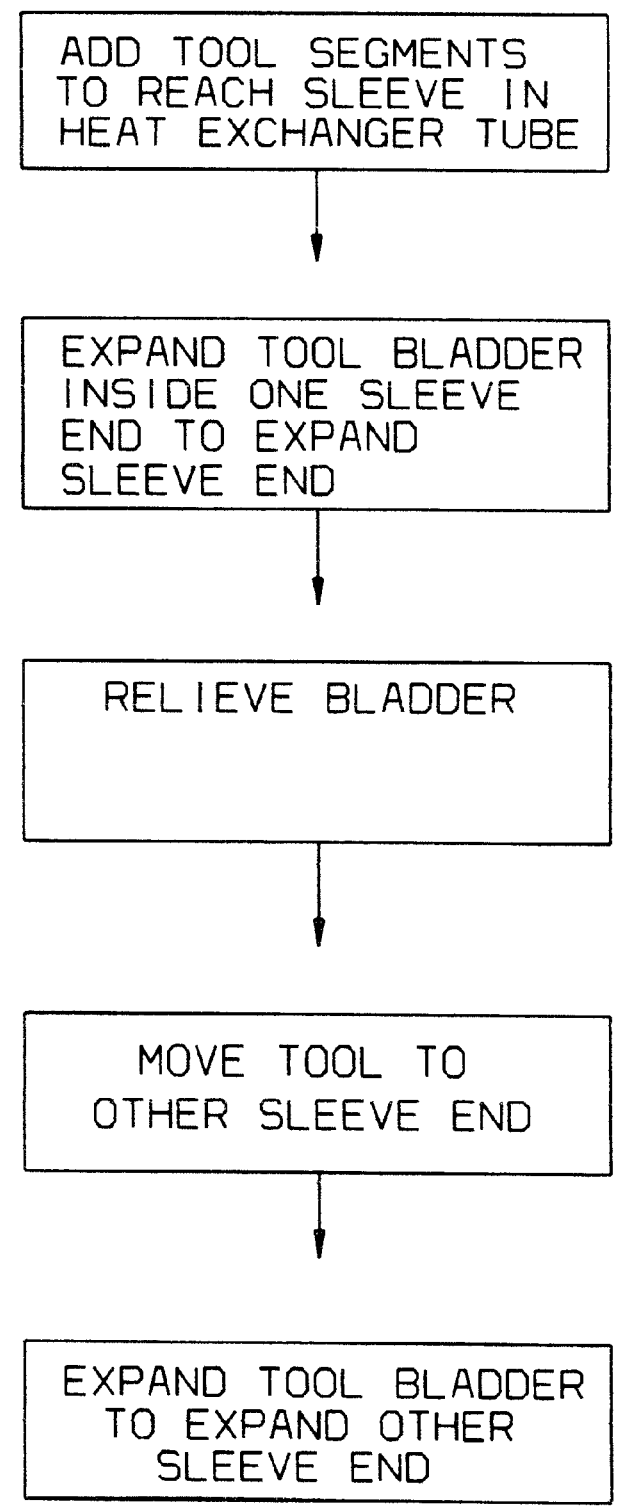
FIG. 3 is a schematic flow diagram showing the sequence of the functions performed by the present invention's apparatus.

Referring now generally to FIGS. 1(a) and 1(b) as well as to FIG. 2, the results of the above described expansion process within a sleeved tube (20) are best shown with particular reference to FIG. 3. The expansion tool assembly (10) consisting of multiple inner pull rods (26) and outer tubes (24), use as many segments (S) as needed so that the tool length can be set as needed to reach the end of the installed sleeve (18). The process of expanding the sleeve (18) ends are as follows:

The sleeve (18) is installed into the proper position within the tube (20) by roll expansion, hydraulic expansion, or other means.

After the expansion tool assembly (10) is in the proper position, the tubesheet spacer hardstop (36) is moved a predetermined distance from the tube end (34) to assure that the expansion tool assembly (10) can move as required during the end expansion process. This involves unlocking the hardstop (36) and moving it a known measured distance from the tube end (34) after the sleeve end hardstop (30) contacts the sleeve end (32).

The hydraulic cylinder (12) is positioned on the back end of the tool assembly (10), using the cylinder connector (40), and the pull rod nut (38) is threaded over the pull rod (26) until it is tight against the cylinder (12). Hydraulic fluid is pumped to the hydraulic cylinder which applies a load through the pull rods(26, 26') to compress the expansion bladder (22). When the correct hydraulic cylinder load is reached the expansion process is stopped and the hydraulic cylinder (12) is depressurized. The expansion tool is moved to the opposite end of the sleeve (18), the tubesheet spacer hardstop (36) is repositioned to a predetermined distance from the tube end (34), and the expansion process is repeated.

After both ends of the sleeve have been properly expanded, the pull rod nut (38) is unthreaded from the pull rod (26), the hydraulic cylinder (12) is removed from the pull rod (26), and the expansion tool assembly (10) is removed from the tube (20), removing the appropriate number of segments (S) from the tool as required based on the restrictions in the area of the heat exchanger.

Using the segmented sections (S) in the assembly (10) allows the expansion bladder (22) to be positioned at multiple axial locations within the tube. The sleeve end hardstop (30) assures that the bladder is properly positioned at the end of the sleeve (18), allowing for consistent expansions. All sleeve locations within the heat exchanger can be end expanded due to the flexible nature of the expansion tooling.

An alternative to the described end expansion tool, and one that would be better suited to the sleeve end expansion process, would be to place the expansion cylinder (12) inside the tube (20). If this configuration was used there would be no need to use the segmented pull rods and outer segments to position the tooling. The cylinder and expansion tooling would be delivered as one assembly against the near sleeve end (32). The expansion process would then be performed as described above, using a predetermined amount of load to expand the sleeve end, minimizing the step between the tube section and repair sleeve. The use of an expansion method such as this would required an expansion cylinder that could fit inside the tube and still deliver a high load to perform the expansion process.

From the foregoing it will be seen that the present invention offers the following advantages when using the sleeve end expansion tool:

By expanding each end of the sleeve into close contact with the parent tube, as shown in FIG. 2, the ID step from the sleeve (18) to the tube (20) is minimized, resulting in a lower probability of erosion/corrosion in the softer parent tube material.

The end expansion process is reliably made due to the repeatable positioning of the end expansion bladder by using a hardstop (30) on the sleeve end (32). The process is controlled to a known pressure which will produce consistent expansions. The use of a solid plastic bladder, which can expand and contract without permanent deformation, to expand the sleeve end minimizes the risk of getting the tooling stuck within the sleeve.

The tooling can be broken into multiple segments which will allow it to be inserted into the majority of the heat exchanger tubes regardless of tube end clearances. The segmented nature of the tooling, along with moveable hardstops (30, 36), also allows the expansion bladder to be positioned at an infinite number of axial positions within the tube and for the tooling to be used for an infinite number of sleeve lengths.

By using the end expansion tooling, sleeves can be installed into relatively soft parent tubing (e.g. brass copper-nickel, copper, carbon steel, etc.) to reclaim tubes that would otherwise be plugged.

Certain modifications and improvements will become apparent to readers of this specification. As an example, alternative expansion means may be used.

Such alternatives to the use of the sleeve end expansion tool include a roll expansion process, an internally pressurized bladder process, and a tapered pin. It should be noted, however, that the following problems could exist with each of these methods;

Roll expansion tooling is typically not flexible enough to be used anywhere along the tube length since it can require the need for more clearance above the tube end than is often times available. However, roll expansion would be an attractive alternative if the sleeve is installed in the same location in all tubes and the sleeve is positioned relatively close to the tube end.

The internally pressurized bladder does not produce repeatable results at the sleeve end due to the need to position the bladder beyond the end of the sleeve. By doing this it is possible for the bladder to fail during the pressurization process since it is not supported by the sleeve all along its length. If this occurs the bladder may become stuck in the sleeve end, making extraction of the tooling very difficult.

Inserting a tapered pin into the sleeve end does a very effective expansion job. However, if the sleeve is installed into a tube with a u-bend it is not possible to expand the end of the sleeve farthest from the tube end. Therefore, a tapered pin can only be used on one end of a sleeve in a u-bend tube.

During the testing of this invention to optimize the sleeve end expansion, tooling was fabricated to test the expansion of the sleeve end into the tube. Prior to performing this testing the outside of the sleeve end was machined to thin the wall. After all of the components were fabricated test expansions were performed as seen in FIG. 2. During testing the expansion bladder was positioned at various locations from the sleeve end to determine the point that produced the optimal end expansion. The load used to compress the bladder was also varied to determine the effect on sleeve expansion.

Ultimately, the expansion tooling and process was finalized to a point where a consistent end expansion was obtained. This optimization resulted in the proper sleeve end expansion. The outside of the sleeve was expanded into contact with the parent tube, resulting in the inside of the sleeve flaring out to meet the tube ID. The process produced a reliable expansion that could be performed repeatedly in the field heat exchangers. This process will minimize the potential for tube erosion/corrosion beyond the sleeve end.

Certain modifications and details have been deleted herein for the sake of conciseness and readability but are intended to fall within the scope of the following claims.

What is claimed is:

1. A tube repair apparatus for expanding the ends of a previously installed sleeve into a portion of heat exchanger tubing inaccessibly located in the heat exchanger comprising:

a series of tube sections connected together to form a length sufficient to extend down to the inaccessibly located defective tubing section;

a series of pull rods connected together and located within said series of tube sections;

an expandable bladder positioned between an end of said tube sections and a moveable threaded stop, which threaded stop is attached to one end of said series of pull rods; and means for pulling said series of pull rods to compress said expandable bladder, causing it to increase in diameter.

2. A tube repair apparatus as set forth in claim 1 wherein said pulling means includes a hydraulic cylinders having on one end said series of tube sections rigidly connected thereto and, on the opposite end of said series of pull rods extending into said hydraulic cylinder to move therethrough in response to hydraulic pressure applied to said hydraulic cylinder to thus compress said bladder.

3. A tube repair apparatus as set forth in claim 2 including a repair sleeve of predetermined length located in the defective portion of the heat exchanger tubing and a hardstop ring located on said series of tube sections to be aligned with an end of said sleeve to prevent further insertion of said bladder into said sleeve.

4. A tube repair apparatus as set forth in claim 3 wherein said hardstop is adjustable and is set to align said end of said bladder connected to said pull rods with an end of said sleeve opposite said end aligned with said hardstop.

5. A tube repair apparatus as set forth in claim 4 wherein said bladder is plastic and expands in diameter in response to compression by said pull rods as per Poisson's ratio.

* * * * *